Figure 1:
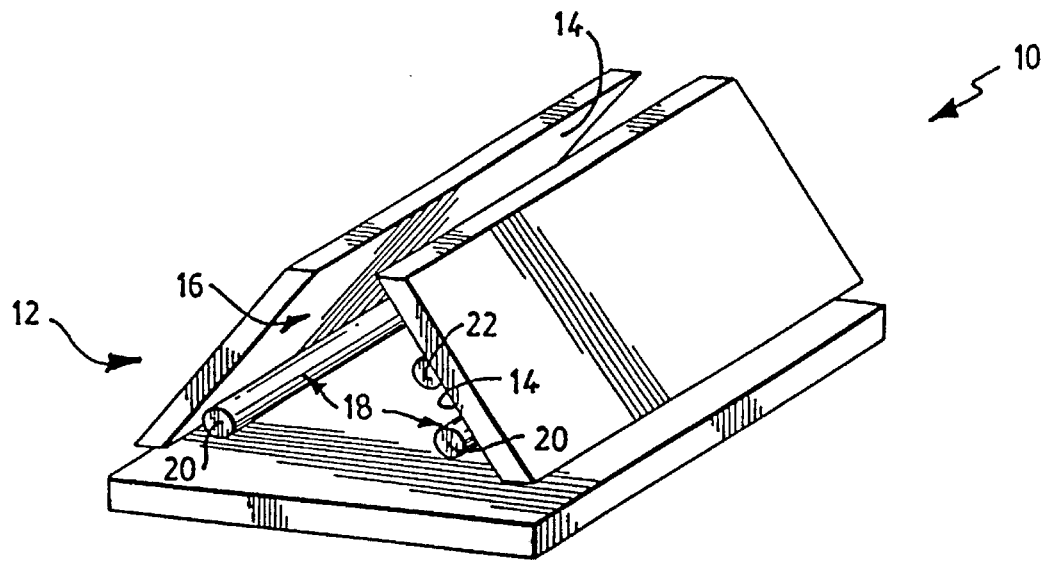
Figure 2:
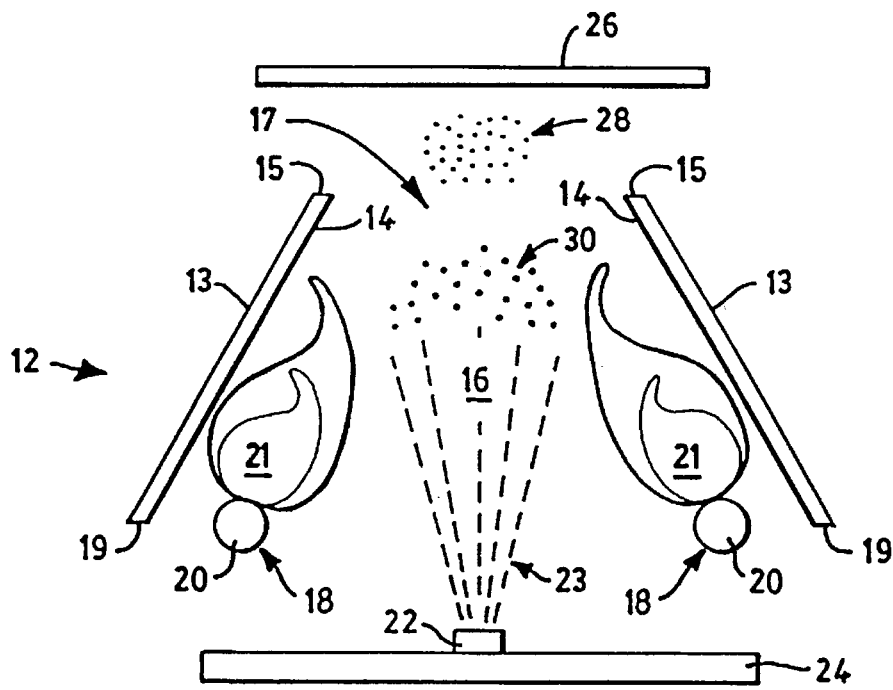

United States Patent [19]

Helble et al.

[11] Patent Number: 5,599,511
[45] Date of Patent: Feb. 4, 1997

[54] APPARATUS FOR PRODUCING NANOSCALE CERAMIC POWDERS

[75] Inventors: Joseph J. Helble, Andover, Mass.; Gary A. Moniz, Windham, N.H.; Theodore F. Morse, Little Compton, R.I.

[73] Assignee: Physical Sciences, Inc., Andover, Mass.

[21] Appl. No.: 449,665

[22] Filed: May 24, 1995

Related U.S. Application Data

[60] Division of Ser. No. 61,069, May 10, 1993, Pat. No. 5,447,708, which is a continuation-in-part of Ser. No. 7,149, Jan. 21, 1993, Pat. No. 5,358,695.

[51] Int. Cl.⁶ .............................. B01J 8/08; B22F 1/00; B29B 9/00
[52] U.S. Cl. .................... 422/232; 422/307; 75/343; 264/12
[58] Field of Search ..................... 422/232, 239, 422/292, 307; 423/593, 594, 598, 600, 608, 618, 624, 632, 635; 75/343; 264/12

[56] References Cited

U.S. PATENT DOCUMENTS

| | | |
|---|---|---|
| 3,450,503 | 6/1969 | Knorr . |
| 3,510,291 | 5/1970 | Brush . |
| 3,993,578 | 11/1976 | Gerontopoulos et al. .............. 252/635 |
| 4,042,374 | 8/1977 | Rasmussen et al. ..................... 75/364 |
| 4,264,641 | 4/1981 | Mahoney et al. .......................... 427/30 |
| 4,724,134 | 2/1988 | Sood ....................................... 423/592 |
| 4,783,214 | 11/1988 | Kemp, Jr. et al. ......................... 75/342 |
| 4,795,330 | 1/1989 | Noakes et al. ............................... 425/6 |
| 4,801,411 | 1/1989 | Wellinghoff et al. ....................... 264/7 |
| 4,812,166 | 3/1989 | Saiki et al. ................................. 75/346 |
| 4,849,140 | 7/1989 | Wellinghoff et al. ....................... 264/9 |
| 4,973,777 | 11/1990 | Alagy et al. ............................. 585/403 |
| 4,999,182 | 3/1991 | Baumard et al. ....................... 423/608 |
| 5,019,686 | 5/1991 | Marantz ............................... 219/76.14 |
| 5,061,682 | 10/1991 | Aksay et al. ............................. 505/425 |
| 5,075,090 | 12/1991 | Lewis et al. ............................ 423/337 |
| 5,081,102 | 1/1992 | Gay et al. ................................ 505/510 |
| 5,122,360 | 6/1992 | Harris et al. ............................. 423/592 |
| 5,124,091 | 6/1992 | Paliwal et al. ............................. 264/15 |
| 5,308,366 | 5/1994 | Stelman ...................................... 48/61 |

OTHER PUBLICATIONS

Okuyama, Kikuo, et al., "Experimental Control of Ultrafine $TiO_2$ Particle Generation From Thermal Decomposition of Titanium Tetraisopropoxide Vapor", *Chemical Engineering Science*, 44:1369–1375 (1989).

Ono, Tomoshige, et al., "Ultrafine $BaPb_{1-x}Bi_xO_3$ Powders Prepared by the Spray–ICP Technique", *Plasma Chemistry and Plasma Processing*, 7:201–209 (1987).

Rice, Gary W., "Laser Synthesis of Si/C/N Powders from 1,1,1,3,3,-Hexamethyldisilazane", *J. of the American Ceramic Society* 69:C183–C–185 (1986).

Siegel, R. W., et al., "Synthesis, Characterization and Properties of Nanophase $TiO_2$", *J. Mater. Res.*, 3:1368–1372 (1988).

(List continued on next page.)

*Primary Examiner*—Robert Warden
*Assistant Examiner*—Christopher Kim
*Attorney, Agent, or Firm*—Testa, Hurwitz & Thibeault, LLP

[57] ABSTRACT

An apparatus provides high temperature and short residence time conditions for the production of nanoscale ceramic powders. The apparatus includes a confinement structure having a multiple inclined surfaces for confining flame located between the surfaces so as to define a flame zone. A burner system employs one or more burners to provide flame to the flame zone. Each burner is located in the flame zone in close proximity to at least one of the inclined surfaces. A delivery system disposed adjacent the flame zone delivers an aerosol, comprising an organic or carbonaceous carrier material and a ceramic precursor, to the flame zone to expose the aerosol to a temperature sufficient to induce combustion of the carrier material and vaporization and nucleation, or diffusion and oxidation, of the ceramic precursor to form pure, crystalline, narrow size distribution, nanophase ceramic particles.

18 Claims, 3 Drawing Sheets

OTHER PUBLICATIONS

Ulrich, Gail D. et al., "Agggregation and Growth of Submicron Oxide Particles in Flames", *J. of Colloid and Interface Science*, 7:257–265 (1982).

Kodas, T. T. et al., "Aerosol Flow Reactor Production of Fine $Y_1Ba_2Cu_3O_7$ Powder: Fabrication of Superconducting Ceramics", Applied Physics *Letters*, 52:1622–1624 (1988).

Matijevic, Egon, "Production of Monodispersed Colloidal Particles", Annual *Review of Materials Science*, 15:483–516 (1985).

Okuyama, Kikuo et al., "Production of Ultrafine Metal Oxide Aerosol Particles by Thermal Decomposition of Metal Alkoxide Vapors", *AIChE J.*, 32:2010–2019 (1986).

Andres, R. P., et al., "Clusters and Cluster–Assembled Materials", *Materials Research*, 4:704–736 (1989).

Bowen, H. Kent, "Basic Research Needs on High Temperature Ceramics for Energy Applications", *Materials Science and Engineering*, 44:1–56 (1980).

Dagani, Ron, "Nanostructured Materials Promise to Advance Range of Technologies", *Science/Technology*, Nov. 23, 1992.

Helble, Joseph J., "Nanometer Oxide Ceramic Particles With Controlled Agglomeration", *Materials & Processing Report*, 5:3–4 (1991).

Helble, Joseph J. et al., "Factors Determining the Primary Particle Size of Flame–Generated Inorganic Aerosols", *J. of Colloid and Interface Science*, 128:348–362 (1989).

APPARATUS FOR PRODUCING NANOSCALE CERAMIC POWDERS

GOVERNMENT INTEREST

The work described herein was supported in part by contracts with the Department of Energy and the Air Force Office of Scientific Research.

RELATED APPLICATION

This is a divisional of application Ser. No. 08/061,069 filed on May 10, 1993, now U.S. Pat. No. 5,447,708, which is a continuation-in-part of application U.S. Ser. No. 08/007,149, U.S. Pat. No. 5,358,685 filed Jan. 21, 1993, the entire disclosure of which is hereby incorporated herein by reference.

BACKGROUND OF THE INVENTION

High-performance ceramic materials are essential for many engineering applications. Ultrafine ceramic powders are used to provide ceramic structures having the integrity, strength, and uniformity necessary to meet high performance requirements. To obtain many of the desirable properties associated with advanced ceramics, (e.g., toughness, high ductility, low sintering temperature and/or superplasticity) ceramic powders having nanometer scale crystalline grain structure, uniformity of crystalline phase, limited degree of particle aggregation, chemical purity, and narrow particle and grain size distributions are essential. Bowen, (1980) *Mater. Sci. Eng.*, 44:1; Andres et al, (1989) *J. Mater. Res.*, 4(3):704; Wakai and Nagano, (1991) *J. Mater. Sci.*, 26(1):241. Large scale exploration of the properties of these materials has been limited, however, by a lack of large quantities of inexpensive nanophase powder having the desired properties.

To address this need, researchers have been exploring many approaches to nanophase powder production. For example, spray drying or spray pyrolysis has been used to produce unagglomerated crystalline powders. In this process, precursor salts are dissolved in water which is sprayed into a high temperature environment. Ceramic particles form as a result of nucleation in the liquid phase, driven by evaporation of water. Although chemical purity is high, processing rates are limited by the need to maintain very low concentrations of precursor solute in the droplets to prevent formation of undesirable fragments and cenospheres. Kodas et al., (1988) *Appl. Phys. Lett.*, 52:1622; Zhang et al., (1990) *J. Am. Ceram. Soc.*, 73(1):61. Industrial flame processes such as $SiCl_4$ oxidation are inherently high rate processes. Such flame processes are best suited to single component systems such as $TiO_2$ or $SiO_2$, and may produce sintered agglomerated powders having a large mean particle diameter due to the extended residence time at high temperature. Ulrich and Riehl, (1982) *J. Colloid Inter. Sci.*, 87:257. Further, ultrafine silica particles have been produced and deposited onto a fiber as part of a fiber optic waveguide manufacturing process. Morse, et al. *SPIE*, 1171–1207 (1989). None of the processes and devices described above meet the criteria for optimum production of nanophase ceramic powders, i.e., the high temperatures required for crystallinity and the short processing (residence) times required for minimal agglomeration.

SUMMARY OF THE INVENTION

The present invention features an apparatus useable in controlled vapor phase or droplet combustion processes for the production of submicron-sized ceramic particles. The apparatus provides high temperature flame environment and short residence times which are necessary for the controllable production of crystalline, single phase, unagglomerated submicron-sized ceramic particles.

In one embodiment, the apparatus comprises a confinement structure having a plurality of inclined surfaces. The confinement structure may, for example, include a pair of oppositely disposed inclined plates having planar inner surfaces. The inclined surfaces serve to confine flame located between the surfaces so as to define a flame zone. A burner system having one or more burners provides flame to the flame zone. It is noted herein that flame refers to one or more individual flames disposed within the flame zone. The burner system may, for example, include a ring burner or parallel, linear ribbon burners. Each burner is located in or near the flame zone in close proximity to at least one of the inclined surfaces. A delivery system is disposed adjacent the flame zone and delivers an aerosol, comprising an organic or carbonaceous carrier material and a ceramic precursor, to the flame zone to expose the aerosol to a temperature sufficient to induce combustion of the carrier material and vaporization and nucleation, or diffusion and oxidation, of the ceramic precursor to form pure, crystalline, uniform submicron-sized ceramic particles.

The delivery system may utilize a nozzle such as a piezoelectric nozzle. A horizontal base plate may also be provided; the nozzle protruding through the plate to deliver the aerosol to the flame zone for the production of the ceramic particles. The formed ceramic particles may be directed through an opening in the confinement structure defined by the distal edge of the inclined surfaces. A collection member may be disposed adjacent the distal edge of the confinement structure to collect the ceramic particles.

The present apparatus is structurally tailored to provide an environment which facilitates the production of unagglomerated, submicron-sized, crystalline ceramic particles. To that end, the confinement structure reduces heat loss so as to provide a uniformly high temperature in the flame zone. Further, the inclined surfaces of the confinement structure provide a degree of confinement for the reaction so that the resulting particles may be more easily collected. Also, the burner system minimizes the occurrence of cooler "edge regions" of the flame zone in which undesirable agglomeration of the particles may occur. Using the present apparatus, processing can be carried out in an environment including a uniform high temperature flame zone having substantially no edge regions, for short time periods to produce unagglomerated, submicron-sized, crystalline ceramic particles.

A method of controlled vapor phase or droplet phase combustion for producing submicron-sized ceramic oxide particles is also the subject of the present invention. In general, the process comprises forming an intimate mixture of an organic or carbonaceous carrier material and an organic or inorganic ceramic precursor, confining a flame generated by one or more burners within a high temperature flame zone defined by a plurality of inclined surfaces of a confinement structure, and delivering the mixture to the flame zone to expose the mixture to a flame zone temperature sufficient to cause the carrier material to oxidize and the ceramic precursor to form ultrafine, submicron-sized ceramic particles. In this method, the heat resulting from the exothermic oxidation (i.e., combustion) of the carrier material causes the ceramic precursor to either vaporize and nucleate, or diffuse away from the burning carrier, thereby forming ceramic particles. The resulting particles are highly pure, crystalline and have a narrow particle size distribution. The particles are exposed to the heat of combustion for a very short time (e.g., a few milliseconds) such that agglomeration is minimized.

The first step of the process comprises combining a ceramic precursor material with organic or carbonaceous carriers. This step may be carried out in a number of ways, using any combustible organic or carbonaceous material as the carrier and any organic or inorganic metallic material that can form a ceramic under combustion conditions as the precursor. This step can be carried out, for example, by combining a ceramic precursor, such as a metal, metal salt, metal oxide or metal compound with a liquid organic matrix, such as a polymer or polymerizable monomer, and solidifying the matrix to form solid organic particles, or solid organic material which can be ground into particles, which contain the inorganic precursor. Alternatively, the ceramic precursor material can be colloidally dispersed in a solution of an organic carrier. In another embodiment, a ceramic precursor is dissolved or dispersed in an organic solvent, e.g., alcohol, or other suitable combustible solvent material. In yet another embodiment, a ceramic precursor is added to a solution of an organic material, such as a sugar or starch, and optionally combined with alcohol, and the resulting solution is sprayed, dried and ultimately combusted to form a powder. As demonstrated by these examples, any method can be used to form an intimate mixture of the combustible carrier and the ceramic precursor, as long as the mixture can be subsequently formed into an aerosol or fine spray of discrete droplets or particles for the combustion step.

The next step of the process involves delivering via a delivery system an aerosol spray of the discrete droplets or particles of the carrier/precursor to a flame, generated by a burner system, within a flame zone defined by the inclined surfaces of a confinement structure to expose the aerosol to a temperature in the flame zone sufficient to ignite the carrier material and cause combustion thereof. The burner system and the confinement structure may be the same as described previously in connection with the apparatus of the present invention. Combustion of the carrier portion of the aerosol creates myriad localized temperature gradients, and causes the ceramic precursor portion to either vaporize, diffuse away from the burning carrier and nucleate; or to diffuse away by convective flow from the combusting carrier into the relatively cooler surrounding gas, forming the ceramic particles. For this step, a temperature of at least 1000 K. and an atmosphere containing at least 20% (by volume) oxygen is preferred. The resulting particles can be collected and used in the desired application.

Ceramic particles which are less than 100 nm in diameter can be produced by the present apparatus and process. The particles produced are of narrow size distribution, pure, highly crystalline, and non-agglomerated. Ceramic particles produced according to the invention also sinter at lower temperatures than do conventional ceramic powders. The process can be used to produce large quantities of high-quality nanoscale ceramic particles for a variety of engineering applications.

BRIEF DESCRIPTION OF THE DRAWINGS

The foregoing summary of the invention, and the various features thereof, as well as the invention itself may be more fully understood from the following detailed description when read together with the accompanying drawings.

FIG. 1 is perspective view of an apparatus for producing nanoscale ceramic particles in accordance with the principles of the invention.

FIG. 2 is detailed cross-sectional view of an apparatus for producing nanoscale ceramic particles.

FIGS. 3A and 3B are transmission electron microscope micrographs of particles of yttria-stabilized zirconia powder produced from zirconyl chloride precursors and dissolved in a sucrose/water solution with alcohol added, FIG. 4 is a graph showing the size distribution of yttria-stabilized powder particles represented in FIGS. 3A and 3B.

DETAILED DESCRIPTION OF THE INVENTION

The development of advanced ceramic components requires large quantities of ceramic powders having nanometer scale grain structure and narrow grain size distribution. The grains or particles which comprise these powders must be chemically pure, crystalline, and narrowly agglomerated. The apparatus of the present invention provides a high temperature, short residence time environment for the production of nanometer scale ceramic oxide powders having all of these characteristics. The apparatus can be scaled up for producing such powders on an industrial scale.

A perspective view of an apparatus for producing nanoscale ceramic particles in accordance with the principles of the present invention is shown in FIG. 1. In general, the apparatus 10 comprises a confinement structure 12 having a plurality of inclined surfaces 14. The inclined surfaces 14 serve to confine flame located between the surfaces so as to define a flame zone 16. A burner system 18, having one or more burners, provides flame to the flame zone 16. Each burner 20 is located in or near the flame zone 16 in close proximity to at least one of the inclined surfaces 14. An aerosol delivery system 22 is disposed adjacent the flame zone 16 to deliver an aerosol, comprising an organic or carbonaceous carrier material and a ceramic precursor, to the flame zone for exposing the aerosol to a temperature sufficient to induce combustion (i.e. exothermic oxidation) of the carrier material and vaporization and nucleation, or diffusion and oxidation, of the ceramic precursor submicron-sized ceramic particles.

The present apparatus 10 is structurally tailored to provide an environment which facilitates the production of unagglomerated, nanoscale, crystalline ceramic particles. To that end, the confinement structure 12 preferably is formed of an insulating material to reduce heat loss so as to provide uniformly high temperatures in the flame zone 16. Further, the inclined surfaces 14 of the confinement structure provide an added degree of confinement for the reaction so that the resulting particles may be more easily collected. Also, the burner system 18 is configured to minimize the cooler "edge regions" of the flame zone in which undesirable agglomeration of particles may occur. The resulting environment, including a uniform high temperature flame zone and substantially no edge regions, is well-suited for the production of high quality ceramic particles.

A detailed cross-sectional view of the present apparatus is shown in FIG. 2. The confinement structure 12, as shown, includes a pair of inclined plates 13. The plates 13 may be formed of smoked quartz or other insulating material and are arranged to provided a pair of oppositely disposed, inclined surfaces 14. These inclined, inner surfaces 14 serve to confine flame 21, which is provided during operation of the apparatus 10, located between the surfaces so as to define the flame zone 16. Further, the distal edges 15 of the respective, inclined surfaces define an opening 17 in the confinement structure 12.

Although a confinement structure including a pair of oppositely disposed, inclined surfaces is shown, it is noted that any confinement structure which includes a plurality of inclined surfaces arranged to define a flame zone can be employed without departing from the scope of the present invention. For example, a confinement structure including three inclined surfaces disposed in a pyramid-like arrangement can be used. Alternatively, a confinement structure including two pairs of oppositely disposed, inclined surfaces disposed in a box-like arrangement can also be used. The confinement structure also may be circular to form a substantially cone-shaped structure having a ring burner, or the like, disposed adjacent the base of the inclined surfaces.

The burner 18 system, as shown, includes a pair of parallel, linear burners 20 for providing flame 21 to the flame zone 16. Each burner 20 is disposed in or near the flame zone 16 in close proximity to the proximal edge 19 of one of the inclined surfaces 14. It is noted that the number and type of individual burners may be varied without departing from the scope of the invention. For example, each burner may be a ribbon burner such as those manufactured by Heathway Burner. Alternatively, each burner may be a row of linearly arranged, individual burner elements. Further, a ring burner or a circular arrangement of individual burner elements may be employed.

The delivery system 22 is disposed adjacent the flame zone and delivers an aerosol 23, comprising an organic or carbonaceous carrier material and a ceramic precursor, to the flame zone 16. The delivery system 22 may utilize a nozzle, such as a Sono-Tek extra length ultrasonic nozzle, or any other nozzle or atomizer-type delivery device. The nozzle may protrude through a central opening in a horizontal base plate 24 disposed opposite the opening 17 in the confinement structure 12. The aerosol 23 is directed by the nozzle to the flame zone 16 exposing the aerosol to a temperature sufficient to cause oxidation of the carrier material and the formation of ceramic particles 28. The particles 28 may be directed through the opening 17 and collected on a collection member 26 disposed adjacent the opening.

The present invention also includes a method for producing unagglomerated, crystalline ceramic particles in the range of 10 to 100 nm. To accomplish this, processing is preferably carried out in the present apparatus at high temperatures and for short periods of time, e.g., millisecond timescales. Processing for longer periods of time may lead to grain growth and particle agglomeration, while processing at lower temperatures may produce amorphous material requiring further heat treatment. Using the present apparatus, processing in its uniformly high temperature environment results in exothermic oxidation (i.e., combustion) of the organic or carbonaceous carrier to generate steep localized temperature gradients. The organic or carbonaceous carrier burns completely away, and pure ceramic particles are formed. Growth of the ceramic particles can be precisely controlled using the apparatus and this process.

The steps in the present process are generally as follows: an organic or carbonaceous carrier material is combined with an organic or inorganic ceramic precursor to form an intimate mixture in which the ceramic precursor is closely associated with the carrier. For example, the carrier/precursor combination may be an organometallic compound or may be carbon carrier particles having the ceramic precursor adsorbed thereon. This mixture is atomized and delivered as an aerosol or fine spray to a flame zone defined by a plurality of inclined surfaces of a confinement structure as described above. The mixture is then exposed to a flame in the flame zone having a temperature sufficient to cause exothermic oxidation (combustion) of the carrier material. Combustion of the carrier generates intense, short-lived, local temperature gradients in the surrounding gas phase thereby inducing formation of ultrafine ceramic particles from the ceramic precursors. The very high temperature flame zone favors formation of crystalline structure in the ceramic particles and the short duration of combustion ensures that agglomeration does not occur. Thus, pure, crystalline, nanometer sized (e.g., about 10 nm to 100 nm) ceramic particles are formed.

The first step in the process comprises forming an intimate mixture of carrier material and a ceramic precursor material. The mixture preferably is formable into discrete droplets or particles. The carrier material can be any combustible organic or carbonaceous material, i.e., any carbon or carbon-hydrogen based material which reacts exothermically with oxygen. Exemplary carriers include carbon, carbon-based synthetic or natural polymers, organic solvents, such as alcohols, carbohydrates (such as sugars or starches) and other organic materials. Organometallic compounds may also be used. The ceramic precursor can be any material which forms a ceramic under oxidizing conditions. Exemplary ceramic precursors include metals, metal oxides, metal salts and other metal compounds. Mixtures of metals, metal salts, metal oxides, metal compounds or organometallic compounds can be used to produce heterogeneous powders. Metallic precursor compounds comprising two or more metals can be used to form multicomponent powders. Inorganic materials (i.e., those lacking hydrocarbon components) can be used as precursors.

The mixture of carrier and precursor can be formed in a number of ways, including, for example, dissolving or dispersing the precursor into a solution or dispersion of the carrier and mixing together until an intimate mixture is obtained; or polymerizing organic monomers in the presence of precursors thereby forming polymer molecules containing the precursor. Liquid carrier/precursor mixtures or dispersions can be dried by spraying, air drying or other method which results in discrete droplets or particles. The preferred ratio of carrier to metal in the precursor is in the range of about 5:1 to about 100:1 on a weight basis.

In the next step, the carrier/precursor mixtures are delivered to a flame zone by a delivery system to be introduced into the high temperature environment of the flame zone. A flame generated by one or more burners of a burner system is confined with the flame zone, which is defined by a plurality of inclined surfaces of a confinement structure. The burner system and confinement structure are preferably the same as described previously in connection with the present apparatus. The mixture is introduced as an aerosol or fine spray by the delivery system, such as by forcing it through a ultrasonic piezoelectric nozzle, by atomization or any other device. The temperature environment of the flame zone should be sufficiently high to cause the organic carrier to ignite and react exothermically (i.e., combustion). The high temperature environment preferably comprises a temperature at least 1000 K. and an atmosphere of at least 20% (by volume) oxygen. The temperature range for applications of the present process can be from about 1200 K. to about 3200 K. However, higher or lower temperatures may be preferred for certain specific embodiments. The overall residence time in the high temperature environment typically is less than 5 seconds, more than 20 milliseconds, and preferably about 100 milliseconds. The residence time of the formed ceramic particles in the actual combustion zone (i.e., the burning carrier droplets) is believed to be less than about 50 μs. Residence time in the cooler flame zone typically is about 100 milliseconds.

Following ignition of the carrier in the flame zone, a small combustion zone is created in the immediate vicinity of the carrier. The elevated temperatures associated with combustion cause the ceramic precursors associated with the organic material to either (a) decompose, vaporize, and diffuse away from the burning particles (referred to as the ceramic vapor pathway), or (b) diffuse away from the burning particles by convective flow (referred to as the colloidal pathway). Once these vapors or colloids encounter the surrounding oxygen-rich gases, the controlling physical phenomena differ slightly for each pathway, however, no differences in the product are noted. The ceramic vapor pathway and the colloidal pathway have been described in U.S. Pat. No. 5,358,695, which has been incorporated by reference, and are not described in detail herein.

In one embodiment of the present process, ceramic precursor compounds are dissolved in a combustible carrier solution such as an alcohol, and exposed to the flame process described above to form the nanoscale ceramic particles. Alcohols which are preferred include, for example, methanol, ethanol, propanol and butanol. In another embodiment, the ceramic precursor is mixed with an aqueous solution or dispersion of an organic or carbonaceous carrier material, such as a sugar, a starch, organic polymer or carbon, and processed as described above. For any of these embodiments, the solution, which includes a ceramic precursor and a combustible carrier, is fed through a delivery system to form an aerosol spray which is introduced into the flame zone of the present apparatus to produce nanoscale ceramic particles.

Commercially available combustible organometallic compounds were dissolved in alcohol, such as methanol or i-propanol, to provide a combustible precursor/carrier solution. These solutions were fed through a piezoelectric nozzle to the flame zone of the apparatus shown in FIG. 1 such that an aerosol was formed. The aerosol rapidly burned to yield nanoscale ceramic particles. Using this approach, oxides of aluminum, tantalum, titanium, silicon, and zirconium have been produced. A mixed yttrium-aluminum ceramic oxide/ yttrium aluminum-garnet phase (YAG phase), has also been produced by mixing yttrium and aluminum organometallic compounds in the appropriate ratios. In all of these situations, the particles had approximately the same size distribution and appearance. The resulting ceramic particles were typically spherical, touching only at the tangents of the spheres. Few examples of pronounced necking (i.e., the transition from single point particle contact to mass buildup between adjacent particles) were found. The high temperature combustion of the organometallic compound ensured that the organic residue was completely burned out, leaving only the desired nanoscale ceramic oxide particles as an end product.

In one specific example, zirconium propoxide (containing 23–28% n-propanol) and n-propanol were combined in a 2:1 mixture such that the resulting mixture was approximately 50% zirconium propoxide and 50% by weight n-propanol. While n-propanol was used, it is noted that other alcohols such as butanol could be used as the solvent. The ribbon burners of the apparatus were supplied with 7 slpm of methane and 17 slpm of oxygen. The resulting mixture was introduced into the flame zone in aerosol form. The alcohol carrier oxidized and burned away, thereby inducing formation of zirconium oxide particles. These particles had diameters in the 4–40 nm range with a mean diameter of about 38 nm. Other ceramic materials have been produced using this specific process, including oxides of aluminum, tantalum, titanium and yttria aluminum garnet (YAG phase).

Another embodiment of the process utilizes metallic compounds such as metal nitrates, hydroxides, and chlorides, associated with organic carriers. In this process, solutions, or dispersions of organic materials such as for example, sugars (e.g., sucrose or sorbitol), were dissolved in water, and the inorganic precursors were added. This mixture was then delivered as an aerosol to the flame zone of the present apparatus. Rapid combustion of the organic material in the aerosol spray, burning as individual droplets rather than as a homogeneous vapor, resulted in the production of nanophase, unagglomerated, crystalline ceramic oxide powders. In a separate process, the precursor/carrier was mixed with alcohol, (e.g., methanol) either alone or in combination with water, as the solvent to increase flame temperatures. In each process, the sucrose or sorbitol droplets remained intact in the initial stages of the flame, thus ensuring that single particle (droplet) combustion occurred. It is noted that the use of a volatile organic solvent (e.g., alcohol) results in vapor phase combustion. This embodiment relies on (slightly viscous) droplet combustion to ensure that the droplets remain intact. This is a distinguishable from vapor phase combustion, as it limits agglomeration by keeping the reacting particles separated. Further, droplet combustion eliminates the need for expensive combustible organometallic compounds. Instead, inexpensive precursor compounds (e.g., acetates, nitrates, chlorides, etc.) can be dissolved or dispersed in a combustible organic solvent. Colloidal precursors, e.g. colloidal zirconium plus yttrium salts, may be used to make the same product if a process utilizing organic spray droplet combustion is used.

In one specific example, zirconyl chloride (15.9 g) was added to water (78 g). Yttrium nitrate (3.43 g) was subsequently added, and the solution was stirred to dissolve the compounds. Next, sucrose (150 g) was added, and the solution was stirred to dissolve the sucrose. It is noted that other sugars, such as fructose and sorbitol, have been used in other examples. Methanol (230 g) was added, and the solution was once again stirred. Using a pump, the solution was forced into a nozzle to produce a spray. The spray was introduced into the flame zone of the present apparatus, resulting in zirconium oxide particles having a mean diameter of 37 nm.

Figure 3A:
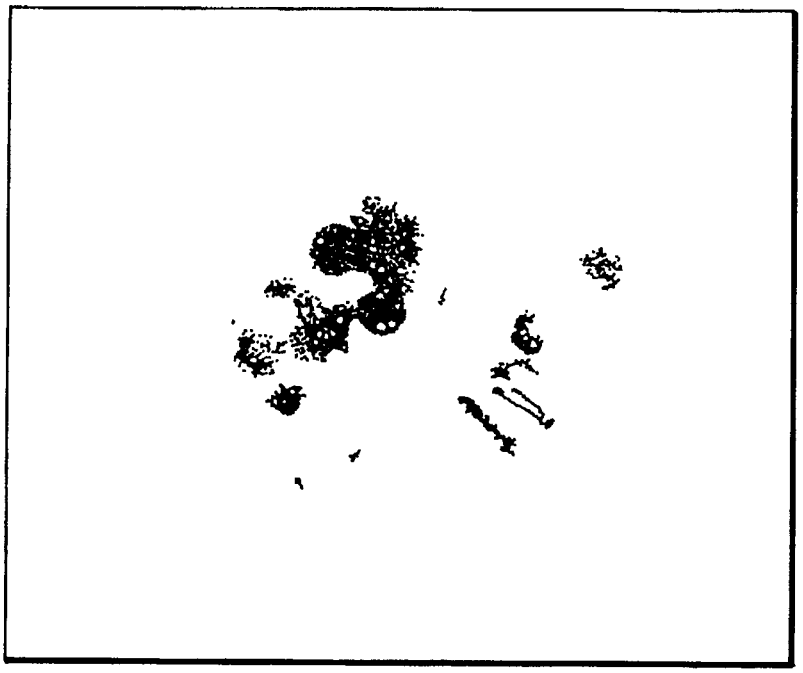
Figure 3B:
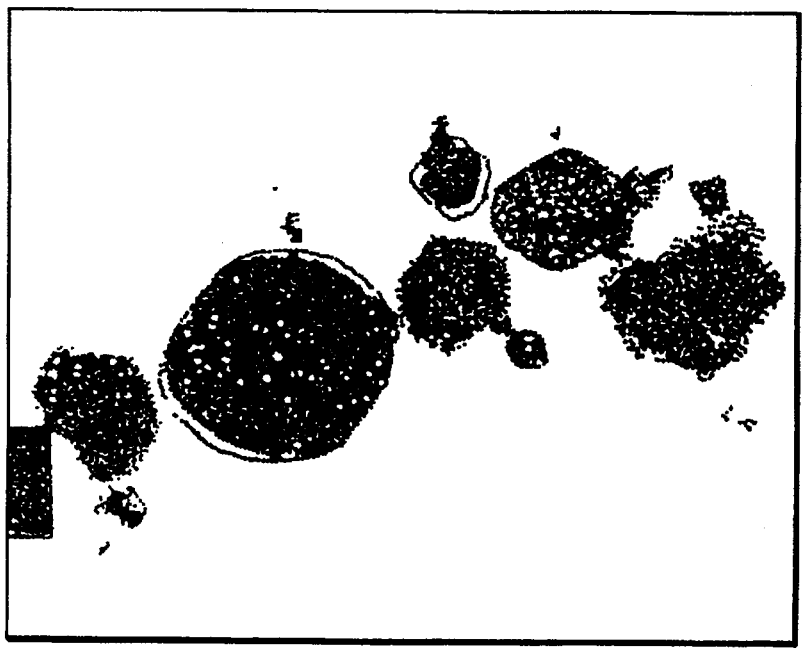
Figure 4:
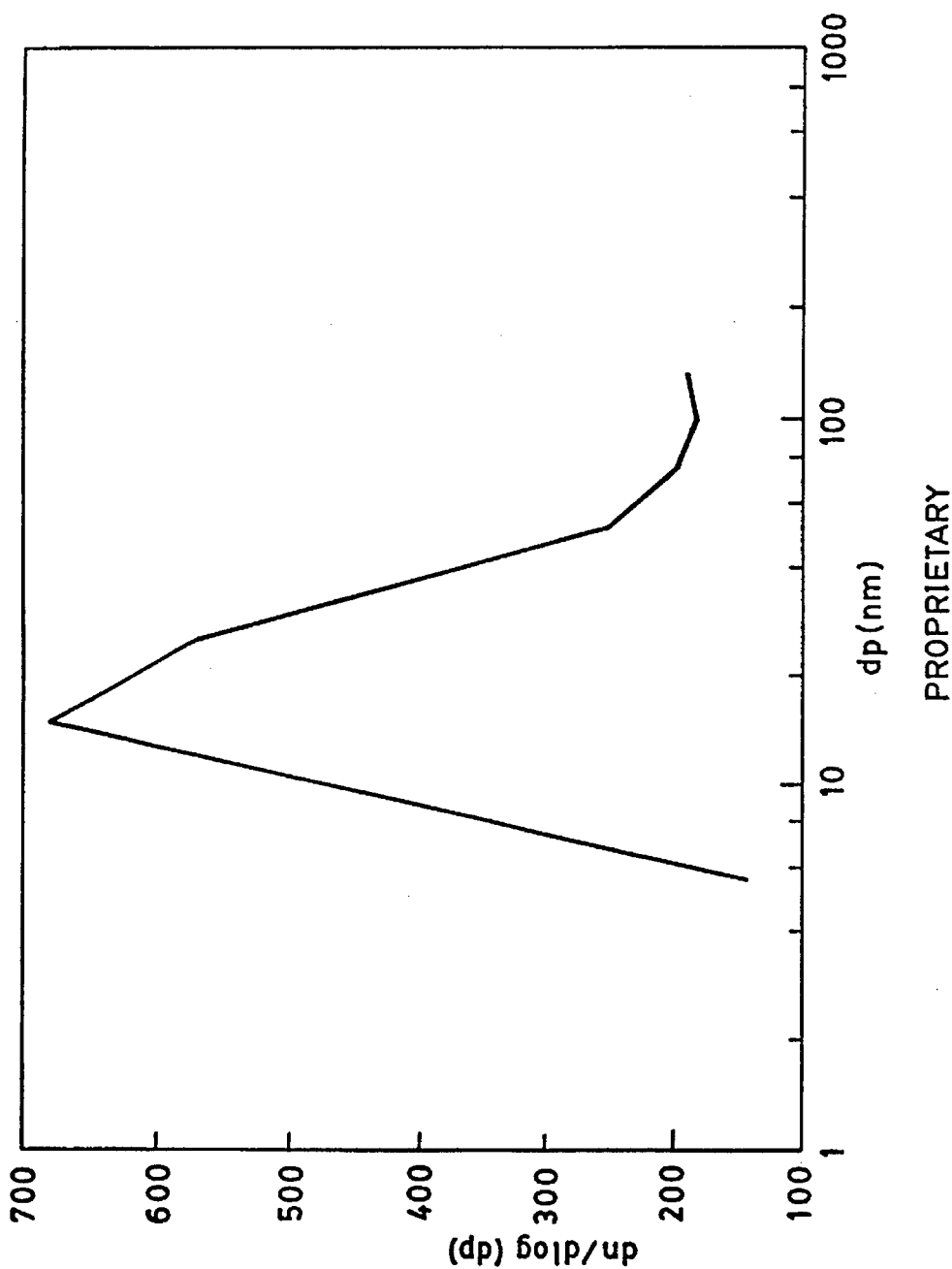

In another specific example, a mixture including zirconium salts and yttrium salts was introduced as an aerosol into the flame zone of the present apparatus. Yttria-stabilized zirconia with particles having a 40 nm mean size was the end product (FIG. 3A and 3B). The particle size distribution is shown in FIG. 4. X-ray diffraction revealed that this was a single-phase crystalline material. Sintering tests subsequently conducted with uniaxially-pressed pellets of this powder demonstrated extensive densification at 1000° C., at least 300° C. lower than the sintering temperatures reported in the literature for larger-grained commercial zirconia powders.

Nanoscale ceramic particles produced according to the present process can be used to make high performance ceramic materials for microelectronics, biotechnology and engineering applications. Ceramic materials typically are made by molding the ceramic powders and sintering the molded article at high temperatures to densify the ceramic.

Ceramic powders having a small, uniform particle size permit closer packing, thus, the sintered body has smaller residual pores and fewer voids. Nonuniform particle size, the presence of agglomerated particles and impurities in the powder make sintering more difficult and require higher sintering temperatures resulting in formation of internal flaws and voids which weaken the final ceramic structure. The present pure, crystalline unagglomerated ceramic powder sinters at a lower temperature, and the small particle size and uniform particle size distribution allows it to compact well and minimizes the occurrence of voids. Thus, high integrity, high performance ceramics having excellent structural characteristics can be produced.

Equivalents

From the foregoing description, one skilled in the art can ascertain the essential characteristics of this invention and without departing from the spirit and scope thereof, can make various modifications of the invention which are equivalent. Such equivalents are intended to be encompassed by the following claims.

We claim:

1. An apparatus for producing submicron-sized ceramic particles comprising:
   a confinement structure having a plurality of surfaces inclined relative to a flame for confining the flame between said surfaces to define a flame zone;
   a burner system including at least one burner for providing flame to the flame zone, each burner located in the flame zone in proximity to at least one inclined surface; and
   a delivery system disposed adjacent the flame zone for delivering an aerosol, comprising a carrier material and a ceramic precursor, to the flame zone to induce combustion of the carrier material, and either vaporization and nucleation, or diffusion and oxidation, of the ceramic precursor thereby forming submicron-sized ceramic particles.

2. The apparatus of claim 1 wherein the confinement structure includes a first pair of oppositely disposed, inclined surfaces.

3. The apparatus of claim 1 wherein the confinement structure is formed of an insulating material.

4. The apparatus of claim 1 wherein the confinement structure is formed of smoked quartz.

5. The apparatus of claim 1 wherein the confinement structure includes an opening defined by a distal edge of each of said inclined surfaces.

6. The apparatus of claim 5 further comprising a collection member for collecting submicron-sized ceramic particles disposed adjacent the opening.

7. The apparatus of claim 1 wherein the burner system includes at least one ribbon burner.

8. The apparatus of claim 1 wherein the burner system includes a pair of linear ribbon burners, each burner in proximity to and substantially parallel with a proximal edge of an inclined surface.

9. The apparatus of claim 1 wherein the burner system includes a ring burner in proximity to each of said inclined surfaces.

10. The apparatus of claim 1 further comprising a horizontal base through which the delivery system protrudes.

11. The apparatus of claim 1 wherein the delivery system comprises a nozzle.

12. The apparatus of claim 1 further comprising a chamber enclosing the confinement structure, each ribbon burner and the delivery system.

13. An apparatus for producing submicron-sized ceramic particles comprising:
    a confinement structure having a plurality of surfaces inclined relative to a flame for confining the flame between said surfaces to define a flame zone and an opening defined by a distal edge of each of said inclined surfaces;
    a burner system including at least one ribbon burner for providing flame to the flame zone, each burner located in the flame zone in proximity to at least one inclined surface; and
    a delivery system disposed opposite the opening in the confinement structure for delivering an aerosol, comprising a carrier material and a ceramic precursor, to the flame zone to induce combustion of the carrier material, and either vaporization and nucleation, or diffusion and oxidation, of the ceramic precursor thereby forming submicron-sized ceramic particles.

14. The apparatus of claim 13 wherein the confinement structure includes a pair of oppositely disposed, inclined surfaces.

15. The apparatus of claim 13 wherein the burner system includes a triad of oppositely disposed linear ribbon burners, each burner in proximity to and substantially parallel with the proximal edge of an inclined surface.

16. The apparatus of claim 13 further comprising a collection member for collecting the submicron-sized ceramic particles disposed adjacent the opening in the confinement structure.

17. The apparatus of claim 13 wherein the delivery system comprises a nozzle.

18. An apparatus for producing submicron-sized ceramic particles comprising:
    a confinement structure having a pair of oppositely disposed, inclined surfaces for confining flame between said surfaces to define a flame zone and an opening defined by a distal edge of each of said inclined surfaces;
    a pair of elongated burners for providing flame to the flame zone, each burner located in the flame zone in proximity to and substantially parallel with a proximal edge of one of said inclined surfaces;
    a collection member for collecting submicron-sized ceramic particles disposed adjacent the opening in the confinement structure; and
    a delivery system disposed opposite the opening in the confinement structure for delivering an aerosol, comprising a carrier material and a ceramic precursor, to the flame zone to induce combustion of the carrier material, and either vaporization and nucleation, or diffusion and oxidation, of the ceramic precursor thereby forming submicron-sized ceramic particles.

* * * * *

UNITED STATES PATENT AND TRADEMARK OFFICE
CERTIFICATE OF CORRECTION

PATENT NO. : 5,599,511
DATED : February 4, 1997
INVENTOR(S) : Joseph J. Helble, Gary A. Moniz and Theodore F. Morse It is certified that error appears in the above-identified patent and that said Letters Patent is hereby corrected as shown below:

Column 1, delete the paragraph following "Government Interest" and insert therefor:

---This invention was made with Government support under DOE Contract No. DE-FG02-92ER81377 awarded by the Department of Energy. The Government has certain rights in this invention.---

Signed and Sealed this

Eighteenth Day of May, 1999

*Attest:*

Q. TODD DICKINSON

*Attesting Officer*   Acting Commissioner of Patents and Trademarks